Jan. 19, 1932.  J. W. SNARRY  1,841,852
MACHINE FOR GRINDING THE TEETH OF GEAR WHEELS AND FOR OTHER LIKE PURPOSES
Filed Oct. 14, 1929  9 Sheets-Sheet 4

Jan. 19, 1932. J. W. SNARRY 1,841,852
MACHINE FOR GRINDING THE TEETH OF GEAR WHEELS AND FOR OTHER LIKE PURPOSES
Filed Oct. 14, 1929 9 Sheets-Sheet 5

INVENTOR:
J. W. Snarry
By Marks & Clerk
Attys.

Jan. 19, 1932. J. W. SNARRY 1,841,852
MACHINE FOR GRINDING THE TEETH OF GEAR WHEELS AND FOR OTHER LIKE PURPOSES
Filed Oct. 14, 1929 9 Sheets-Sheet 6

INVENTOR:
J. W. Snarry
By: Marks & Clerk
Attys.

Jan. 19, 1932. J. W. SNARRY 1,841,852
MACHINE FOR GRINDING THE TEETH OF GEAR WHEELS AND FOR OTHER LIKE PURPOSES
Filed Oct. 14, 1929 9 Sheets-Sheet 8

INVENTOR:
J. W. Snarry
By:
Marks & Clerk
Attys.

Fig.13.

Patented Jan. 19, 1932

1,841,852

UNITED STATES PATENT OFFICE

JOHN WILDSMITH SNARRY, OF BIRMINGHAM, ENGLAND, ASSIGNOR TO THE GEAR GRINDING COMPANY LIMITED, OF BIRMINGHAM, ENGLAND

MACHINE FOR GRINDING THE TEETH OF GEAR WHEELS AND FOR OTHER LIKE PURPOSES

Application filed October 14, 1929, Serial No. 399,676, and in Great Britain November 17, 1928.

This invention relates to machines for grinding the teeth of gear wheels, and for other like purposes, and has for its object to provide automatic means for trimming the active surfaces of the grinding wheel.

The grinding wheels employed in such machines ordinarily comprise three active surfaces—two side surfaces adjacent to the periphery of the wheel, and the peripheral surface. Hitherto the two side surfaces have been trimmed by hydraulically actuated mechanical means through the medium of a pantograph or the like. But the peripheral surface, which is of less importance as regards the accuracy of its contour than the side surfaces, has been trimmed wholly or in part by hand operations. Also the peripheral trimming has been effected after the wheel has been moved from the position in which the side trimming is done.

It is desirable to effect the whole of the trimming operations automatically, and while the grinding wheel occupies a given position, and as the ordinary procedure cannot conveniently be carried out mechanically, it is necessary for the successful mechanization of the operation to proceed in a different manner, as will hereinafter be described.

The present invention comprises the arrangement of the peripheral trimmer at a distance from the side trimmers, and preferably in a position diametrically opposite the side trimmers.

Also the invention comprises the mounting of the peripheral trimming tool on a rotatable holder so that the active part of the tool is located at a small distance away from the axis of rotation, and the carrying of the holder on a support which can oscillate about an axis parallel with the said axis of rotation, the locus or path of the tool being determined by a cam or other equivalent means.

Further the invention comprises means as hereinafter described for co-ordinating the movements of the peripheral trimmer with the motions of the side trimmers, and for imparting feeding motions to the grinding wheel and peripheral trimmer.

In the accompanying sheets of explanatory drawings:—

Figure 2a is a front elevation of Figure 1a.

Figure 10 is a diagrammatic view of a connection between a reciprocating slide, and the plunger of valve mechanism shown in Figure 4.

Figure 11 is a partial sectional view of the end of an actuating rod shown in Figures 1a, and 2a.

Figure 1:
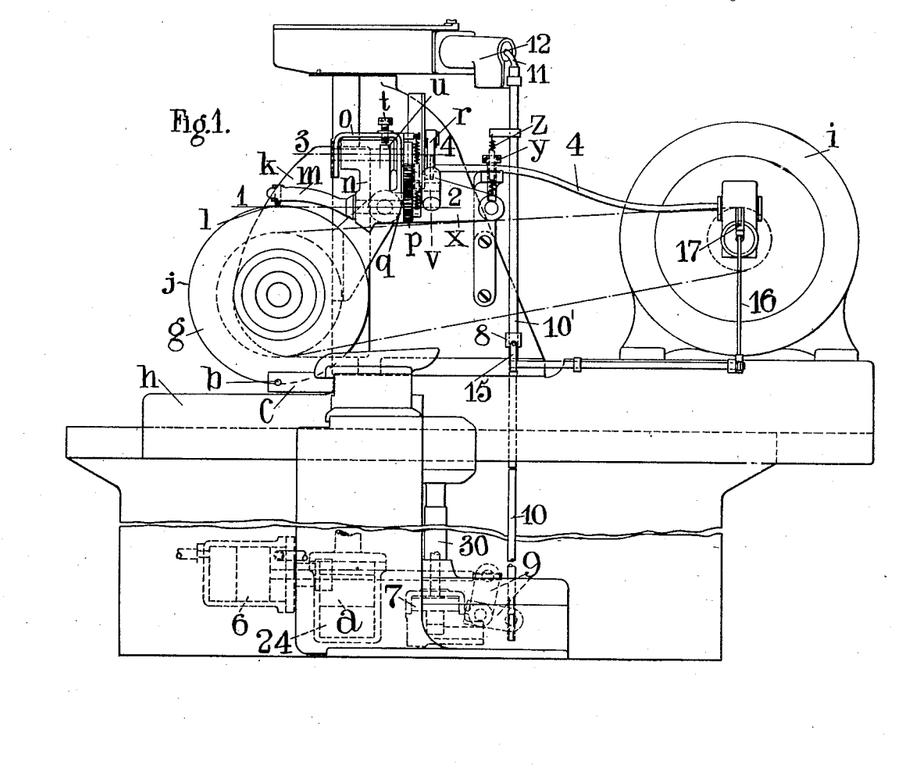
Figure 1 is a side elevation of a toothed gear wheel grinding machine provided with wheel trimming mechanism constructed in accordance with this invention.
Figure 4:
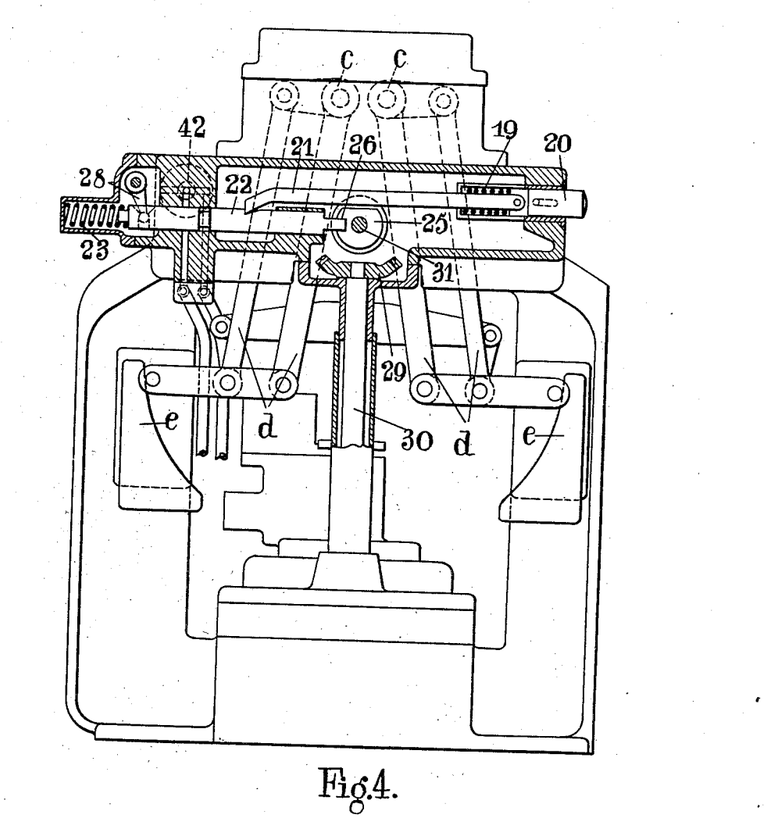
Figure 4 is a front elevation partly in section of a portion of the controlling mechanism.
Figures 6, 9:
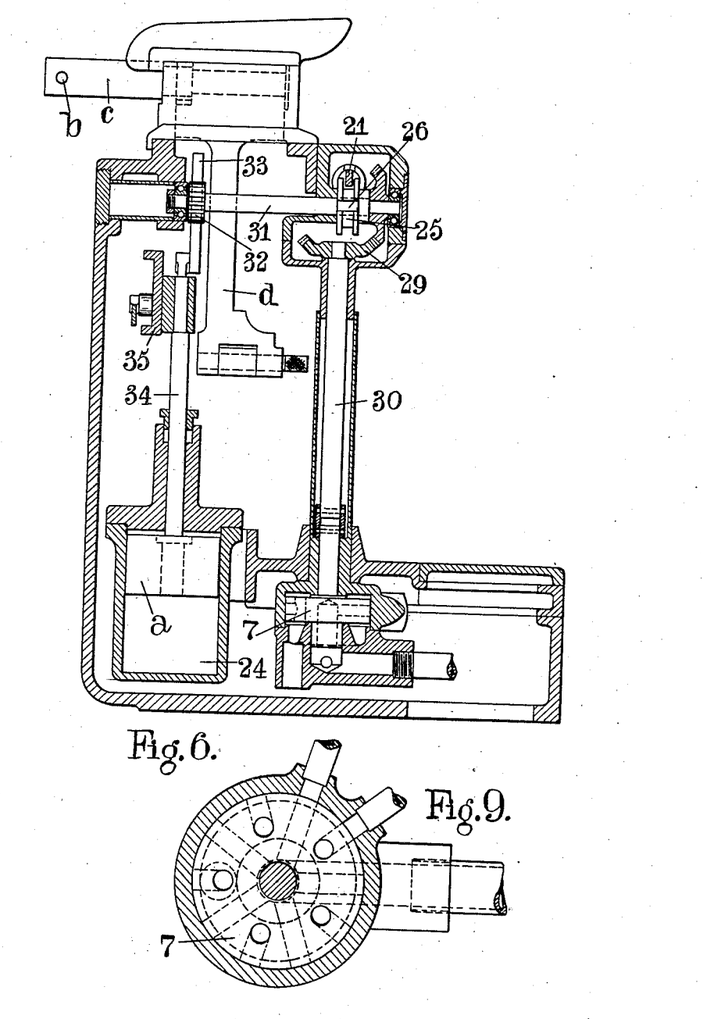
Figure 6 is a sectional side elevation of the mechanism shown in Figures 4 and 5, taken on line 6—6 of Figure 4.
Figure 9 is a horizontal section of a fluid distributing valve shown in Figure 6.
Figure 12:
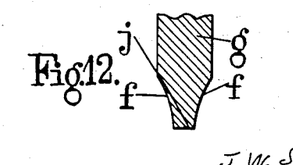
Figure 12 is a partial sectional view of the peripheral edge of a gear grinding wheel, showing the active edges of same.

In carrying the invention into effect, I operate the side trimmers by a hydraulically operated reciprocatory piston $a$ Figs. 1 and 6. Each trimmer comprises a diamond $b$ mounted in a rotatable holder $c$ and the holders receive their motion from the piston $a$ through suitable pantograph or like mechanism as heretofore in this art. In the example illustrated, this mechanism comprises links $d$ Fig. 4, connected to the holders $c$ and co-operating with fixed templets $e$; these parts, however, form no part of my present invention as they are already known. The trimmers impart the required configuration to the side faces *f* of the grinding wheel *g* Figs. 1 and 12, adjacent to its periphery, such faces serving to impart the required configuration to the working faces of the wheel teeth to be ground. The grinding wheel *g* is rotatably mounted upon a horizontal reciprocatory slide *h* Figs. 1 and 2 and may be driven by an electric motor *i* mounted on the slide and shown in Fig. 1. After a predetermined number of working strokes, the slide *h* is moved back to a position at which the lower side of the grinding wheel *g* is ought adjacent to the side trimmers, and remains in this position during the trimming operation. To effect the automatic trimming of the periphery *j* Fig. 2a of the grinding wheel, I arrange the peripheral trimmer 1 above the wheel, and I mount the same upon the same headstock *k* as the wheel, the headstock which forms a part of the reciprocating slide *h* being adapted to impart vertical adjustments or feeding movements, to the grinding wheel *g* in the direction of the lower side trimmers.

Figure 1A:
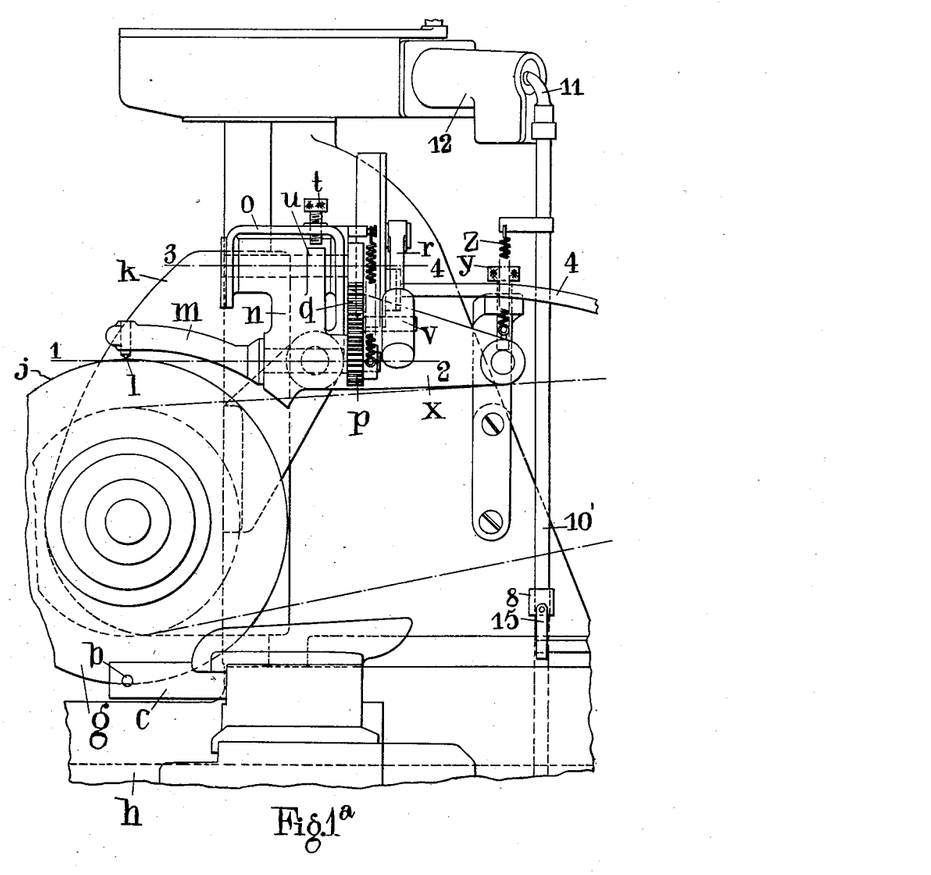
Figure 1a is a partial side elevation, showing the trimming mechanism on a larger scale than Figures 1 and 2.
Figure 2:
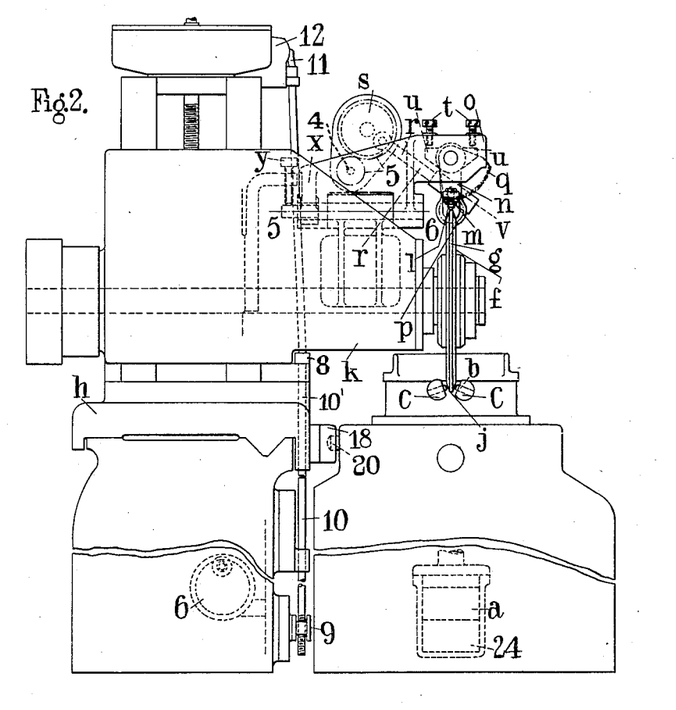
Figure 2 is a front view of Fig. 1.

The function of the peripheral trimmer 1 is to restore the tip or peripheral portion of the grinding wheel *g* to its proper shape, and also slightly round the edges at the junctions of the peripheral surface with the side surfaces of said wheel. The peripheral trimmer 1 consists of a diamond *l* mounted in a holder *m* which is capable of rotating about a horizontal axis 1, 2, (Figure 1) and the active part of the trimming tool 1 is situated slightly above this axis so that when the tool is rotated it can describe an arc of small radius for effecting the rounding off of the edges of the grinding wheel. Also the holder *m* is mounted at the lower end of a support or carrier *n* Fig. 1a which is capable of being oscillated about an axis 3, 4, (Figure 1), above and parallel with the axis of rotation above mentioned. The oscillatory carrier *n* is mounted on a bracket *o*, which is pivoted to the headstock *k* on the slide *h*, and is adapted to be rocked about the axis 5, 6, (Figure 2). At the rear of the holder *m* is secured a pinion *p* arranged coaxially with the axis 1, 2, and this pinion meshes with a toothed quadrant *q* secured to carrier *n* coaxially with the axis 3, 4. The quadrant *q* is connected by a rod *r* to a crank disc *s*, the rotation of which is produced as hereinafter described. Adjustable stops *t* on the bracket *o* are arranged to form abutments which can cooperate with shoulders *u* on the carrier *n*. The connection between the rod *r* Fig. 1a, and the quadrant *q* is effected by a pin *v*, and the latter is engaged by springs *w*, *w* Fig. 11, in the hollow end of the rod *r*, the springs serving to allow the rod *r* to move slightly in excess of the movement of quadrant *q* so as to insure the shoulders *u* being held tightly against one or the other of the stops *t* when the quadrant reaches the limit of its oscillatory movement. The springs *w*, *w* are clearly illustrated in the detail view at Figure 11. During the reciprocation of the rod *r* the carrier *n* is first caused to swing about the axis 3, 4, thus enabling the trimmer 1 to trim part of the periphery of the grinding wheel. As soon as one of the shoulders *u* is arrested by a stop *t*, the carrier arm *n* ceases to move, and the continued motion of the rod *r* causes the quadrant *q* to impart a rotational motion to the pinion *p*, and so swing the trimmer 1 about the axis 1, 2, for the purpose of rounding off one edge of the grinding wheel *g*. During the return motion of the rod *r* this movement of the trimming tool 1 is repeated in the reverse direction. After passing the original position the further motion of the rod *r* causes the trimmer 1 to traverse the remainder of the transverse periphery of the grinding wheel until the carrier arm *n* is again arrested by the other stop *t*, whereupon the opposite edge of the grinding wheel *g* is rounded off. In the return motion of rod *r* this latter half of the trimming operation is also repeated.

After each action or a predetermined number of actions, of the side trimmers, the grinding wheel *g* is moved down through a small distance preparatory to the next action, but seeing that the peripheral trimmer 1 is mounted on the headstock *k* so that it moves with the grinding wheel *g*, additional means are needed to insure the correct feeding movement being given to the peripheral trimmer 1. Such means comprise a lever *x* Figs. 1a, 2a secured to the pivoted bracket *o* on which the oscillatory carrier *n* is mounted, and the outer end of the lever is arranged in a fixed, but adjustable connection with a stationary part carrying the headstock *k*. In the example illustrated the rear end of the lever *x* abuts against an adjustable stop *y*, Fig. 1a, and is held in such position by a spring *z*. The distance between the fulcrum of the lever *x* and the stop *y*, is the same as that between the fulcrum of the lever *x* and the trimming tool. Consequently, when a feeding movement is given to the headstock *k*, twice this amount of movement is transmitted to the peripheral trimming tool 1, and in consequence the said peripheral trimmer is advanced towards the grinding wheel, by the same amount as the wheel is advanced towards the side trimmers.

Figures 2A, 10, 11:
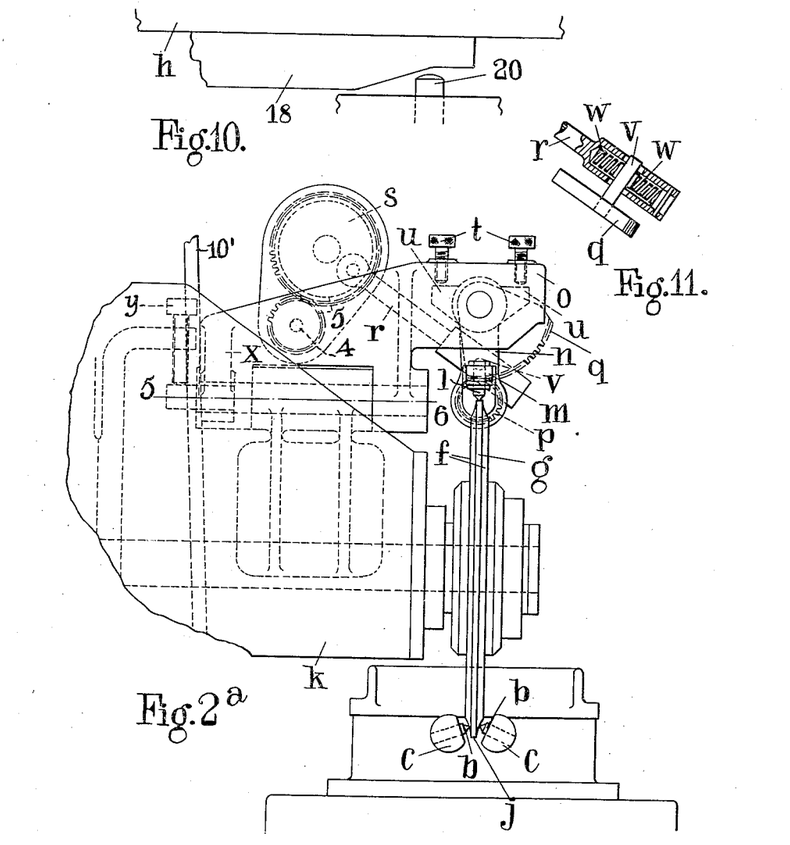

Actuation of the oscillatory carrier *n* of the peripheral trimmer 1 may be effected through disc *s* and rod *r* Fig. 2a from any convenient source of motion. For example, the electric motor *i* Fig. 1 which rotates the grinding wheel *g* may be employed, motion being taken therefrom through a clutch 2, Fig. 8, worm reduction gear 3, and flexible shaft 4 Fig. 1 to toothed wheels 5, 5, one of which drives the crank disc *s* and connecting rod r. The clutch is controlled by means connected with a feed motion of the grinding wheel headstock k so that the action of the peripheral trimmer 1 alternates with that of the feed mechanism; this mechanism is described more fully later and is illustrated in the detail in Figure 8.

Figure 3:
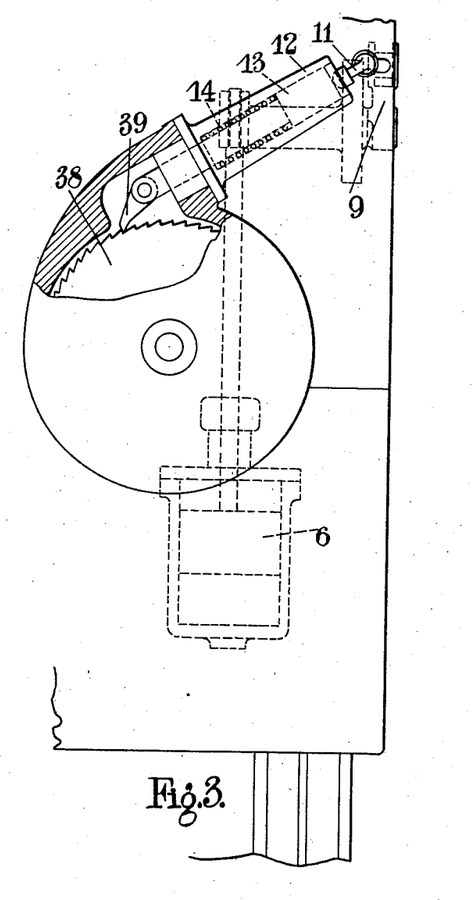
Figure 3 is a plan of the wheel feeding mechanism.

For automatically feeding the grinding wheel g downwards in the direction of the side trimmers b, b, Fig. 2a, I employ an hydraulically operated piston 6, Fig. 1 the movement of which is controlled by a valve 7 under the control of the piston a which actuates the side trimmers. Motion is taken from the feed piston 6 to a ratchet 38 and pawl 39 (Figure 3) acting on the screw of the headstock k carrying the grinding wheel g, through a suitable lever 9 Fig. 1 and a thrust rod 10. Preferably this thrust rod is made in two parts 10, 10', one of which 10' is carried by the reciprocating slide h, and the other by the fixed base h¹ of the machine, the two parts coming into coincidence as shown in Figure 1, so that motion can be transmitted from one to the other, when the slide h is drawn back to the trimming position. Connection between the upper end of the rod 10' and the pawl 39 is effected by a rocking piece 11 Fig. 3 carried on a cylindrical part 12 which contains a plunger 13 acted on by a spring 14, the pawl 39 being attached to the plunger 13. In the upward motion of the rod 10' Fig. 1 the part 11 presses the plunger against the spring 14 through a sufficient distance to produce the required motion of the ratchet 38; during the return of the rod 10' the plunger 13 and pawl are returned into operative engagement with the ratchet 38 by the spring 14.

In connection with the rod 10' is arranged a tappet 8 (Figures 1 and 8) which controls the clutch 2 above mentioned. During the upward motion of the rod 10' the tappet 8 acts on a lever 15 which through a rod 16 and resilient lever 17 brings the clutch 2 into action, and so causes motion to be given to the peripheral trimmer 1. During the return of the rod 10' the tappet puts the clutch out of action.

Figure 7:
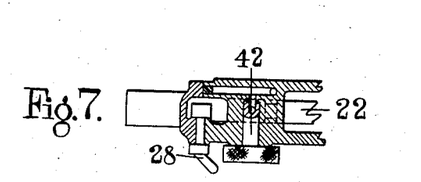
Figure 7 is a detail sectional view of a hand operated valve.

The automatic starting of the trimming mechanism when the slide h is brought back to the correct position, and the co-ordination of the movements of the different mechanisms, may be effected as follows: When the slide h is brought to the trimming position, an abutment 18 (Figure 10) on the same, imparts a linear movement against the action of a spring 19 (Figure 4) to a plunger 20 attached to a pawl 21, which engages a longitudinally movable valve stem 22 and imparts movement to this valve against the action of a spring 23 for admitting fluid to the cylinder 24 and piston a Fig. 1 of the side trimmers. The valve and the passages controlled thereby are shown in elevation at Figure 4 and in plan in the detail view at Figure 7. The lever 28 is a hand lever whereby the valve can be actuated by hand at any time. The pawl 21 also rests upon a flat portion of the periphery of a rotatable cam 25 and the adjacent reduced end of the valve stem engages a notch 26 in the cam. By the rotation of this cam, as hereinafter described, (after the pawl 21 has opened the valve and pushed the valve stem 22 clear of the cam 25) the pawl is raised out of engagement with the valve stem 22 by the cam, and the valve stem 22 is held in the open position. The valve cannot return to its closed position under the action of its spring 23, neither can the pawl 21 re-engage the stem until the cam 25 has performed one complete revolution, and brought the notch 26 opposite the end of the valve stem 22. During this revolution, the various trimming and feeding operations are performed upon the grinding wheel g.

Figures 5, 8:
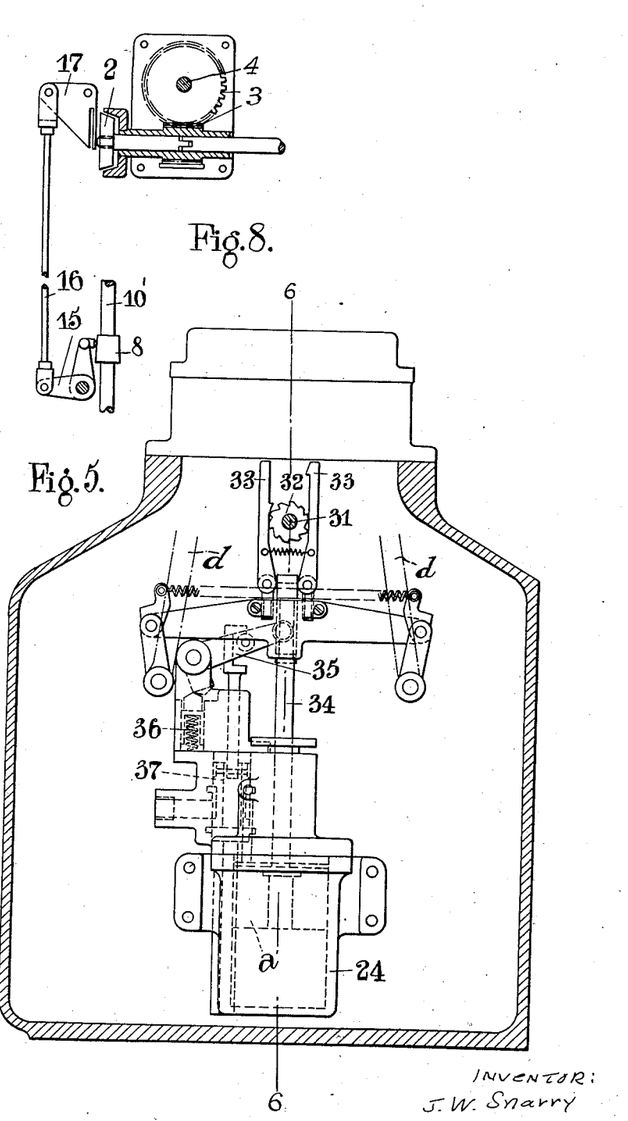
Figure 5 is a view similar to Fig. 4 showing another portion of the said mechanism.
Figure 8 is a view illustrative of an operating clutch with associated parts.

The cam 25, is connected through bevel wheels 29, Fig. 6, to a spindle 30 connected with a rotary fluid distributing valve 7 which controls the motion of the feeding piston 6, and also is connected through its spindle 31, Fig. 5, with a ratchet wheel 32 to which an intermittent rotary motion can be imparted for the rotation of the valve 7, and cam 25, from a pair of pawls 33 carried on the upper end of the rod 34 by which motion is imparted from the piston a to the pantograph of the side trimming mechanism. The distributing valve 7 may if desired have the parts which would come into action towards the end of the complete trimming operation omitted, for the purpose of allowing the side trimming tools to operate on the grinding wheel g after the feeding motion has stopped, and thus make sure the said grinding wheel g is trimmed true to desired size. The two pawls 33, 33 are situated on opposite sides of the ratchet 32, and both impart movement to the ratchet in the same direction. The amount of movement given in each action is sufficient to rotate the valve from one position to another, for the purpose of producing opposite movements of the feeding piston 6, a suitable pause being allowed between each movement, and the mechanism which transmits motion from the feeding piston to the grinding wheel g is, as already mentioned, caused to control the clutch 2 through which a motion is imparted to the peripheral trimmer 1. After the ratchet wheel 32 Fig. 5, has performed one complete revolution, the cam 25, Fig. 4, comes back to its original position; when the valve controlled by stem 22 which admits fluid to the piston of the side trimmers returns under the action of its spring 23, and the pawl 21 which is actuated by the slide h is allowed to fall, and when the said slide h moves away, re-engages the valve stem 22, in readiness for a repetition of the cycle of operations. It will be understood that after the valve controlled by valve stem 22 has been opened, the piston $a$ continues in a state of reciprocation until the valve is reclosed. The control of fluid to opposite sides of the piston $a$, Fig. 1, alternately, is effected by any convenient valve mechanism which is actuated by the said piston $a$. In the example illustrated, Fig. 5, the piston rod 34 acts on a lever 35 which operates in conjunction with a spring 36 for actuating a slide valve 37 but this mechanism forms no part of my present invention as it has been previously employed by me in an earlier machine.

Figure 13:
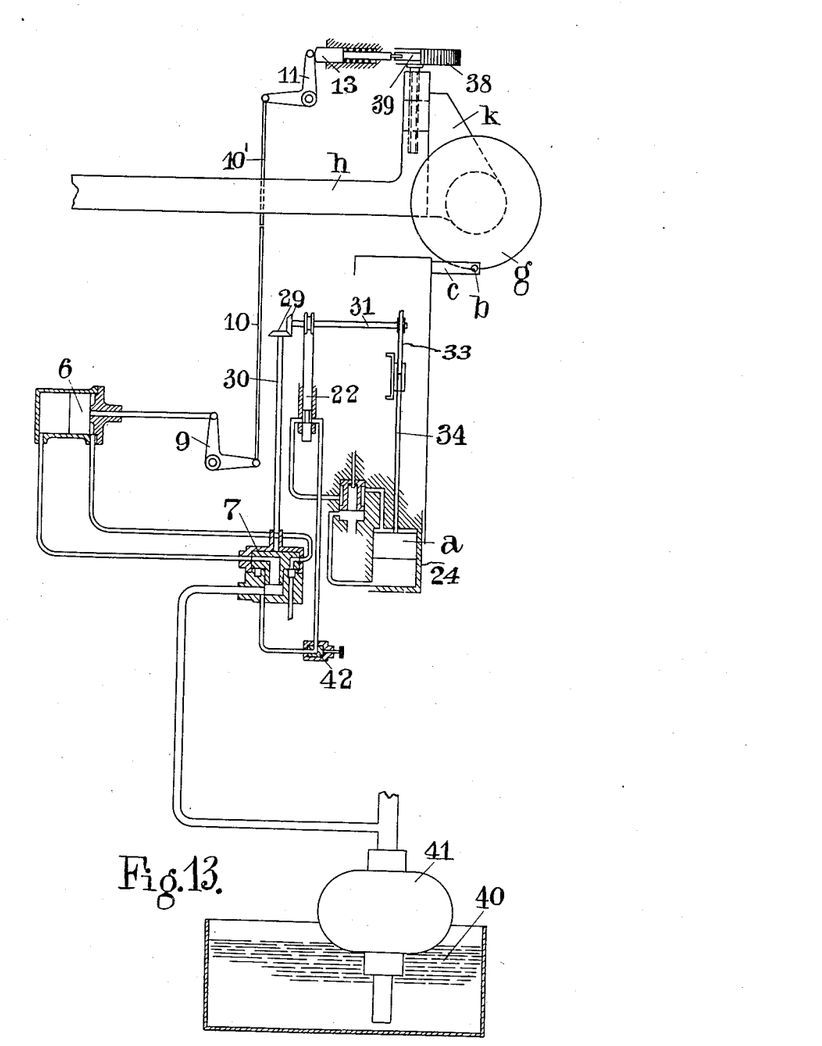
Figure 13 is a diagram illustrating the operative features of my invention.

The system whereby the pressure fluid is distributed to the different parts of the machine is illustrated diagrammatically at Figure 13, and will be readily understood from that diagram. At 40 is shown an oil or other fluid reservoir. From this fluid is forced by a pump 41 to the rotary distributing valve 7. From this point fluid can pass through the adjustable regulating valve 42 to the valve 22 independently of the valve 7. The fluid which passes to the piston 6 is controlled by the valve 7, and as already described, this fluid is utilized to operate the mechanism whereby motion is given to the ratchet and pawl on the headstock $k$ carrying the grinding wheel $g$, and to the clutch which controls the operation of the peripheral trimmer 1. The fluid which passes to the valve 22a is used to operate the piston $a$ of the side trimmers, and this motion is utilized for actuation of the valve 7 which controls the reciprocation of the piston 6.

While I have described one application of my invention to the trimming mechanism of a gear grinding wheel machine, it will be understood that the invention is equally applicable to other like grinding machines, for example, the machines employed for grinding splines of spindles. Also the invention is not limited to any particular subordinate mechanical details, as these may be varied to meet different requirements.

Having thus described my invention what I claim as new and desire to secure by Letters Patent is:

1. In machines for grinding the teeth of gear wheels and for other like purposes, the combination with a peripheral trimming tool, a rotatable holder carrying the trimming tool at a small distance from the axis of rotation of the trimming tool, an oscillatory support which can oscillate about an axis parallel with the axis of rotation of the tool, means cooperating with the oscillatory support for producing the required locus or path of the trimming tool, of a pair of shoulders and stops for limiting the movement of said support, a toothed pinion and quadrant for interconnecting the support and the trimming tool, and mechanism acting on said means for operating the trimming tool.

2. In machines for grinding the teeth of gear wheels and for other like purposes, the combination with mechanism as claimed in claim 1, and a motor which rotates the grinding wheel and is carried on the same slide as the grinding wheel, of speed reduction gearing, a clutch, a flexible shaft and a crank mechanism by which motion is transmitted from the motor to the trimming mechanism, and hydraulic mechanism for controlling the clutch.

3. In machines for grinding the teeth of gear wheels and for other like purposes, the combination with hydraulically operated mechanism for actuating the side trimming tools, and hydraulically controlled mechanism for actuating the peripheral trimming tool, of wheel feeding mechanism which receives motion from the same hydraulic mechanism which controls the peripheral trimming tool, a rotary valve for controlling the hydraulic mechanism associated with the wheel feeding and peripheral trimming mechanism, and a ratchet and pawl actuated by the hydraulic mechanism of the side trimming tools for rotating the valve.

4. In mechanism as claimed in claim 1, a bracket pivoted on the movable part of the headstock carrying the grinding wheel, the said bracket having the peripheral trimming mechanism mounted thereon, and a lever or lever-like extension of the bracket co-operating with a fixed part of the headstock, so that a feeding movement of a given amount of the grinding wheel is accompanied by a movement of twice that amount in the trimming tool.

5. In machines for grinding the teeth of gear wheels and for other like purposes, the combination with hydraulically operated mechanism, side trimming tools actuated by said mechanism, a peripheral trimming tool, and hydraulically controlled mechanism for actuating the peripheral trimming tool, of wheel feeding mechanism which receives motion from the same hydraulic mechanism which controls the peripheral trimming tool, a rotary valve for controlling the hydraulic mechanism associated with the wheel feeding and peripheral trimming mechanism, a ratchet and pawl actuated by the hydraulic mechanism of the side trimming tools for rotating the valve.

6. In machines for grinding the teeth of gear wheels and for other like purposes, the combination with side trimming tools, of hydraulically operated mechanism for actuating the side trimming tools, a peripheral trimming tool, and hydraulically controlled mechanism for actuating the peripheral trimming tool, wheel feeding mechanism which receives motion from the same hydraulic mechanism which controls the peripheral trimming tool, a rotary valve for controlling the hydraulic mechanism associated with the wheel feeding and peripheral trimming mechanism, a ratchet and pawl actuated by the hydraulic mechanism of the side trimming tools for rotating the valve.

7. In machines for grinding the teeth of gear wheels and for other like purposes, the combination of a grinding wheel, trimming means acting on the sides of the grinding wheel, a fluid operated reciprocatory piston adapted to actuate said trimming means, a rotary shaft, a ratchet mechanism through which intermittent movement is imparted to said shaft by said piston, a rotary valve actuated by said shaft, a reciprocatory fluid operated piston controlled by said valve, a support carrying the grinding wheel, feeding means acting on the support for moving the grinding wheel towards the trimming means, and means for transmitting movements from the second mentioned piston to the support, substantially as described.

8. In machines for grinding the teeth of gear wheels and for other like purposes, the combination of a grinding wheel, trimming means acting on the sides of the grinding wheel, a fluid operated reciprocatory piston adapted to actuate said trimming means, a rotary shaft, a ratchet mechanism through which intermittent movement is imparted to said shaft by said piston, a rotary valve actuated by said shaft, reciprocatory fluid operated piston controlled by said valve, a support carrying the grinding wheel, a reciprocatory slide carrying said support, feeding means consisting in part of a ratchet and acting on the support for moving the grinding wheel towards the trimming means, and means consisting in part of a pair of endwise engageable rods for transmitting movements from the second mentioned piston to the ratchet, one of the said rods being mounted on and movable parallel to itself by the slide, substantially as described.

9. In machines for grinding the teeth of gear wheels and for other like purposes, the combination with the mechanism claimed in claim 7, of a slidable valve for controlling the fluid supply to the two pistons, substantially as described.

10. In machines for grinding the teeth of gear wheels and for other like purposes, the combination with the mechanism claimed in claim 7, of oscillatory means for trimming the periphery of the grinding wheel, a rotary source of motion, a clutch for transmitting motion from said source to said trimming means, and means actuated by the mechanism which transmits feeding motion to the grinding wheel for controlling said clutch, substantially as described.

In testimony whereof I have signed my name to this specification.

JOHN WILDSMITH SNARRY.